United States Patent
Min et al.

(10) Patent No.: US 8,730,613 B1
(45) Date of Patent: May 20, 2014

(54) RETRACTING AN ACTUATOR

(71) Applicant: Seagate Technology LLC, Cupertino, CA (US)

(72) Inventors: Shuang Quan Min, Singapore (SG); June Christian Ang, Singapore (SG); Tze Ming Jimmy Pang, Singapore (SG); Kian Keongh Ooi, Singapore (SG); Paul E. Dienstbier, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/718,082

(22) Filed: Dec. 18, 2012

(51) Int. Cl.
    *G11B 21/12* (2006.01)

(52) U.S. Cl.
    USPC .......................................... 360/75; 318/400.31

(58) Field of Classification Search
    None
    See application file for complete search history.

(56) References Cited

U.S. PATENT DOCUMENTS

| 7,054,091 | B2 | 5/2006 | Swize | |
|---|---|---|---|---|
| 7,421,359 | B2 | 9/2008 | Harmer et al. | |
| 7,633,702 | B1 | 12/2009 | Heimbaugh | |
| 7,902,778 | B2 | 3/2011 | Yamashita et al. | |
| 8,134,318 | B2 | 3/2012 | Ayala, II et al. | |
| 2002/0141102 | A1* | 10/2002 | Kusumoto | 360/75 |
| 2009/0128946 | A1 | 5/2009 | Ooi et al. | |
| 2012/0151162 | A1 | 6/2012 | Trantham et al. | |

\* cited by examiner

*Primary Examiner* — Regina N Holder
*Assistant Examiner* — Brian Butcher
(74) *Attorney, Agent, or Firm* — HolzerIPLaw, PC

(57) ABSTRACT

An apparatus and associated methodology for retracting a first member in relation to a second member. The first member may be selectively moveable by a first motor and the second member may be selectively moveable by a second motor that operably generates a back electromagnetic force (BEMF) voltage $V_{BEMF}$. In an embodiment a retract control circuit may control movement of the first member via the first motor in response to a loss of supply power to the second motor. An embodiment of the apparatus may include a backup power source storing a voltage $V_B$ after the loss of supply power. Another embodiment of the apparatus may include retract logic operative on the retract control circuit to divide the $V_B$ from the $V_{BEMF}$ to energize the first motor by the $V_{BEMF}$ and not the $V_B$ when the $V_B$ is greater than a predetermined threshold voltage and a loss of the supply power to the second motor is detected.

20 Claims, 6 Drawing Sheets

RETRACTING AN ACTUATOR

SUMMARY

Some embodiments of the described technology contemplate an apparatus that includes a retract control circuit for retracting a first member in relation to a second member. The first member can be selectively moveable by a first motor and the second member can be selectively moveable by a second motor that operably generates a back electromagnetic force (BEMF) voltage $V_{BEMF}$. The retract control circuit may control movement of the first member via the first motor in response to a loss of supply power to the second motor. An embodiment of the apparatus may include a backup power source storing a voltage $V_B$ after the loss of supply power. Another embodiment of the apparatus may include retract logic operative on the retract control circuit to divide the $V_B$ from the $V_{BEMF}$ to energize the first motor by the $V_{BEMF}$ and not the $V_B$ when the $V_B$ is greater than a predetermined threshold voltage and a loss of the supply power to the second motor is detected.

Some embodiments of the described technology contemplate a method that may include the following: monitoring a supply power to a first motor and a second motor in a device having a first member selectively moveable by the first motor and a second member selectively moveable by the second motor, the second motor being operable to generate a back electromagnetic force (BEMF) voltage $V_{BEMF}$; dividing a backup power source voltage $V_B$ from the $V_{BEMF}$ when the $V_B$ is greater than a predetermined threshold voltage and a loss of the supply power to the second motor is detected; and energizing the first motor with the $V_{BEMF}$ and not the $V_B$, responsive to the dividing operation.

Some embodiments of the described technology contemplate a data storage device configured to operably move an actuator via a first motor in relation to a storage member rotated by a second motor, the second motor generating a back electromagnetic force (BEMF) voltage $V_{BEMF}$. In an embodiment the data storage device may include retract circuitry that, responsive to a loss of supply power to the data storage device, divides a backup power source voltage $V_B$ from the $V_{BEMF}$ when the $V_B$ is greater than a predetermined threshold voltage, to energize the first motor by the $V_{BEMF}$ and not the $V_B$ and to energize an electronics load of the retract circuitry by the $V_B$ and not the $V_{BEMF}$.

DETAILED DESCRIPTION

Initially, it is to be appreciated that this disclosure is by way of example only, not by limitation. The post loss of supply power retract concepts herein are not limited to use or application with any specific system or method that employs the components as specifically arranged in the illustrative embodiments of the disclosure. That is, although the instrumentalities described herein are for the convenience of explanation, shown and described with respect to exemplary embodiments, it will be appreciated that the principles herein may be applied equally in other types of systems and methods. For example, without limitation, the actuator can be retracted via a motor other than a voice coil motor in equivalent alternative embodiments. Likewise, for example, the backup power source can be something other than a capacitor, such as a battery or other energy cell in alternative equivalent embodiments.

Figure 1:
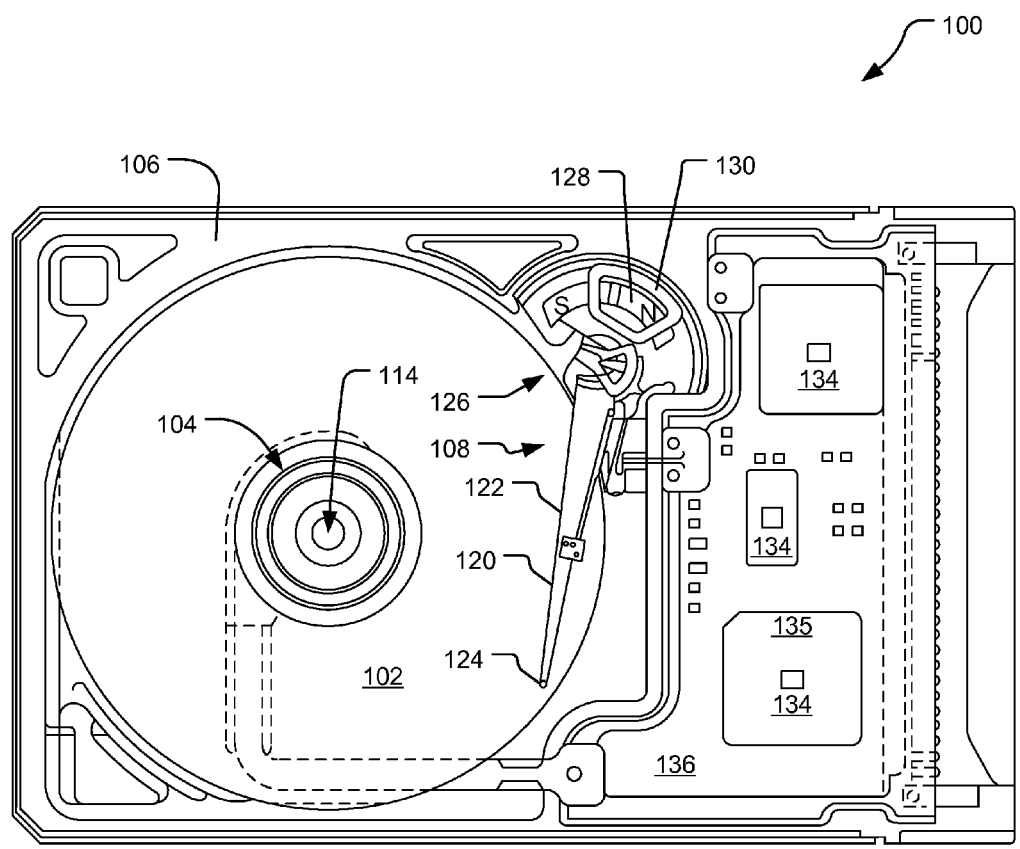
FIG. 1 depicts an example data storage device for retracting an actuator after a loss of supply power.

FIG. 1 depicts a data storage device 100 for retracting an actuator after a loss of supply power. The data storage device 100 includes one or more magnetic recording discs 102 that are mounted to a rotatable hub of a spindle motor 104 and rotated at a high speed. The spindle motor 104 is mounted to a base plate 106. An actuator 108 is also mounted to the base plate 106. The data storage device 100 also includes a cover plate (not shown) that is coupled to the base plate 106 and encloses the disc 102 and actuator 108.

The actuator 108 includes a flexure arm 120 attached to an actuator arm 122. A read/write head (or "head") 124 is attached to the end of the flexure arm 120. The head 124 is constructed to magnetize the disc 102 in writing data and to sense the magnetic field symbolizing data stored on the disc 102 in reading data. The actuator 108 pivots about a bearing assembly 126 that is mounted to the base plate 106.

Attached to the end of the actuator 108 is a magnet 128 located in close proximity to an electrical coil 130. The arrangement of the magnet 128 and coil 130 is commonly referred to as a voice coil motor (VCM). The spindle motor 114, the head 124 and the VCM are coupled to a number of electronic circuits 134 mounted to a printed circuit board 136. Although not specifically depicted, the electronic circuits 134 may include a read channel chip, a microprocessor-based controller, a random access memory (RAM) device, a voice coil motor driver, and a spindle motor driver. The electronics circuits 134 also include a retract circuitry 135 for controlling a retract cycle on the actuator 108 in accordance with the described technology following a loss of supply power to the data storage device 100.

The data storage device 100 typically includes a plurality of discs 102 and, therefore, a plurality of corresponding heads 124 mounted to flexure arms 120 for the top and bottom of each disc surface. However, it is also possible for the data storage device 100 to have just a single disc 102.

The flexure arm 120 is manufactured to have a bias such that if the disc 102 is not spinning, the head 124 will come into contact with the disc surface. When the disc 102 is spinning, the head 124 typically moves in close proximity to (above or below depending on position in a stack) the respective disc surface; the spatial separation therebetween called the "fly height." The fly height is maintained by an air bearing that is created by the spinning of the disc surface such that a boundary layer of air is compressed between the spinning disc surface and the head 124. The bias on the flexure arm 120 forces the head 124 closer to the disc surface, while the air bearing forces the head 124 away from the disc surface. Thus, the bias on the flexure arm 120 and air bearing act together to maintain the desired fly height when the disc 102 is spinning.

The head 124 (or array of heads 124) is selectively moved close to the surface of the disc(s) in a data transfer relationship therebetween. Each head 124 is radially positioned by the actuator 108, as positionally guided by a servo control system.

The servo control system operates in two primary modes: seeking and track following. During a seek, a selected head 124 is moved from an initial track to a target track on the corresponding disc surface. Upon reaching the target track, the servo control system switches to the track following mode to maintain the head 124 in the data transfer relationship with the target track. During track following, prerecorded servo burst fields are sensed by the head 124 and demodulated to generate a position error signal (PES), which provides an indication of the position error of the head 124 away from a desired location along the track (e.g., the track center). The PES is then converted into an actuator control signal, which is fed back to the actuator 108 to position the head 124 accordingly.

It will be understood that if the disc 102 is not spinning at a high enough rotational speed such as revolutions per minute (RPM), the air bearing produced under the head 124 may not provide enough force to prevent the flexure arm 120 bias from forcing the head 124 to contact the disc surface. If the head 124 physically contacts an area on the disc surface that contains data, some of the data in the contact area may be lost. To avoid this, the actuator 108 is routinely positioned such that the head 124 does not contact a data-containing area (a data track) of the disc 102 when the disc 102 is not spinning, or when the disc 102 is not spinning at a high enough RPM to maintain an air bearing.

Figure 4:
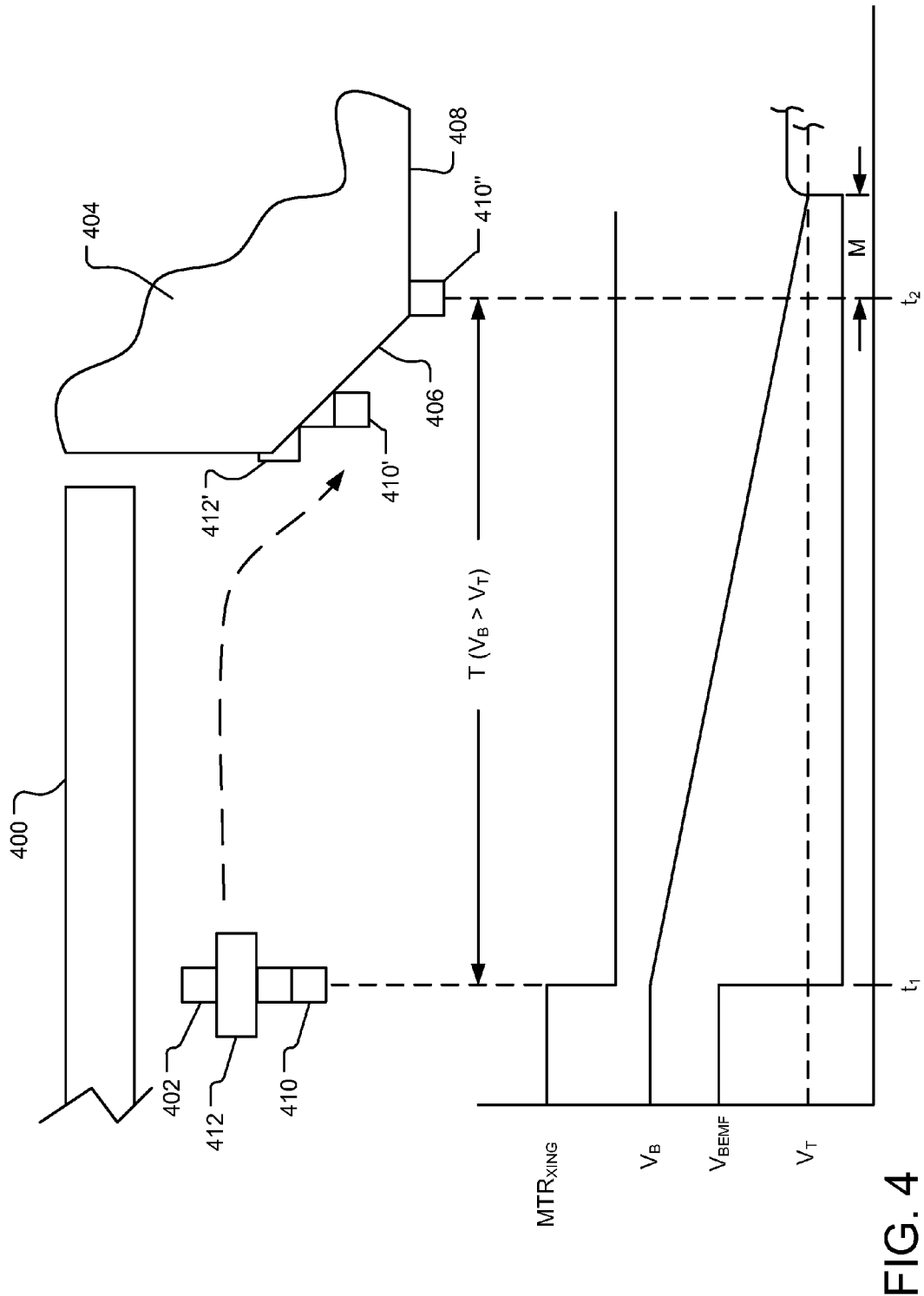
FIG. 4 diagrammatically and graphically depicts considerations for sizing the capacitor to provide $V_B$.

In a load/unload (L/UL) drive, the actuator 108 is positioned such that a tab on the end of the flexure arm 120 near the head 124 contacts a ramp (FIG. 4, 404). The tab located at the end of the flexure arm 120 contacts an inclined surface of the ramp as the actuator 108 is moved to a parked position. Parking the actuator 108 on the ramp keeps the head 124 from inadvertently contacting the disc surface. The use of the ramp may also make more of the disc surface available for storing customer data, as opposed to a contact start stop (CSS) drive, which incorporates the landing zone into a portion of the disc surface itself that might otherwise be used for more data tracks.

In a CSS drive, the actuator 108 is positioned such that the head 124 is parked in a designated landing zone of the disc 102. The landing zone is an annular area on the disc 102 surface that does not contain customer data and is designed to facilitate contact between the head 124 and the disc surface. For example, the landing zone can be a textured area on the disc 102 to reduce the frictional engagement between the head and the disc surface, thus reducing stiction problems when the disc 102 begins to spin.

In a normal shut down operation, the control electronics 134 operate to position the actuator 108 such that the head 124 does not contact the data containing portion of the disc surface when the disc 102 slows and eventually stops spinning. However, in certain situations the data storage device 100 may lose supply power while a head 124 is flying over data tracks of the disc 102. Such situations may, for example, stem from a loss of power to the computer system containing the data storage device, a power supply malfunction within the computer or data storage device, or an inadvertent disconnect of the power to the data storage device prior to it being shut down.

Typically, loss of supply power to the data storage device is detected by using a supply power monitor circuit located within the control electronics 134. This supply power monitor includes an undervoltage detector, which monitors the supply power to the data storage device. If the supply power to the data storage device drops below a specified level, the undervoltage detector resets the electronics within the drive, and informs retract circuitry to initiate a retract cycle to move the actuator to the parking zone or ramp. Once the retract cycle is complete, a brake cycle can be initiated to slow the spinning disc. This braking can be achieved by shorting the windings of the motor 114.

The retract circuitry 135 can be contained within the electronic circuits 134, and is powered in accordance with the present embodiments. When the retract cycle is initiated, the retract circuitry 135 is electrically connected to the windings of the spindle motor 114. If the motor is spinning at a high enough RPM, the voltage induced to the windings (BEMF voltage) can be used to meet the mechanical load of retracting the actuator 108, or to meet the electrical load of operating the electronics circuits 134 at least to the extent necessary to operate the retract circuitry to perform the retract cycle.

Figure 2:
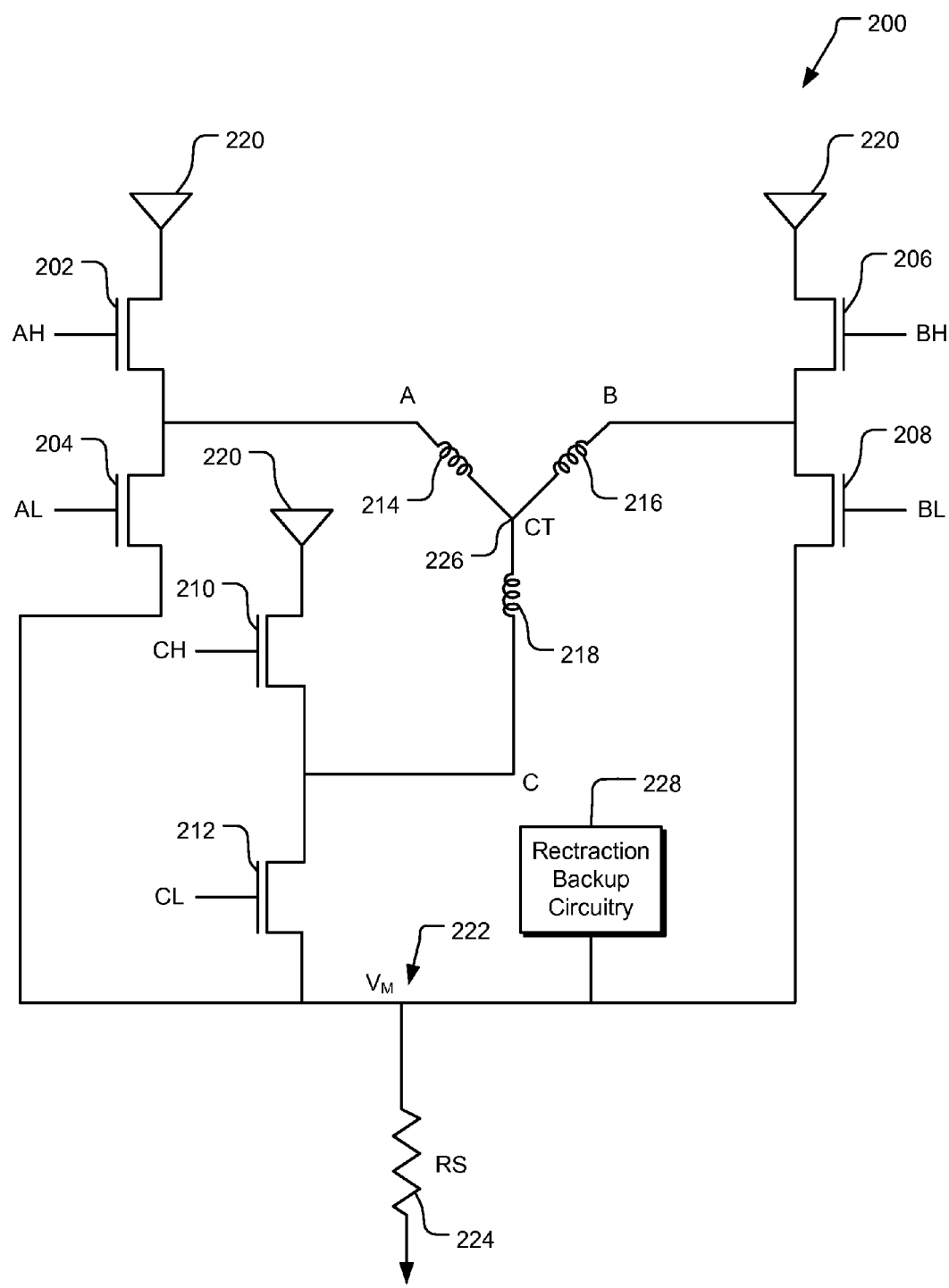
FIG. 2 schematically depicts an example driver for the motor in the data storage device.

FIG. 2 schematically depicts an example driver circuit 200 for controlling a spindle motor, particularly to rotate the spindle motor under normal power conditions and to power the retract cycle operations during a loss of supply power. The driver circuit 200 includes six field effect transistors (FETs) 202, 204, 206, 208, 210 and 212, with inputs denoted as AH (A high), AL (A low), BH, BL, CH and CL, respectively. Under normal operations when supply power is available, controlled and timed application of drive currents to the various FETs result in flow of current through current entry points A, B and C of phase windings 214, 216 and 218. The drive currents flow from an external voltage source 220 to $V_M$ node 222, and through the sense resistor (RS) 224 to ground.

During one commutation step, phase A (winding 214) is supplied with current, phase B (winding 216) outputs (sinks) current, and phase C (winding 218) is held at high impedance, by selectively turning on the AH FET 202 and the BL FET 208, and turning off the AL FET 204, the BH FET 206, the CH FET 210 and the CL FET 212. In this way, current flows from the source 220, through the AH FET 202, through the A phase winding 214, through the center tap (CT node 226), through the B phase winding 216, through the BL FET 208 to the $V_M$ node 222, and through the sense resistor 224.

The resulting current flow through the A and B phase windings 214 and 216 induce electromagnetic fields which interact with a corresponding array of permanent magnets mounted to the rotor, thus inducing a torque upon the rotor in the desired rotational direction. The appropriate FETs are sequentially selected to achieve the remaining commutation states and timings as necessary to rotate the motor.

In the event that supply power is lost, the momentum of the rotor keeps it rotating in a wind-down state until bearing frictional resistance and/or braking brings the rotor to rest. During that wind-down rotation the permanent magnetic field induces a back electromagnetic field (BEMF) in the rotating coils 214, 216, and 218. The BEMF voltage $V_{BEMF}$ at the output of the spindle motor is denoted by the node $V_M$. Retraction backup circuitry 228 is responsive to an indication that the supply power has been interrupted to control how the $V_{BEMF}$ is utilized. That is, under certain conditions the retraction backup circuitry 228 dedicates the $V_{BEMF}$ to powering only the mechanical load of retracting the actuator to the parking zone; in other conditions the retraction backup circuitry 228 may provide at least a portion of the $V_{BEMF}$ to serve a dual purpose of powering that mechanical load as well as powering the electronics load of the data storage device during the actuator retraction.

Figure 3:
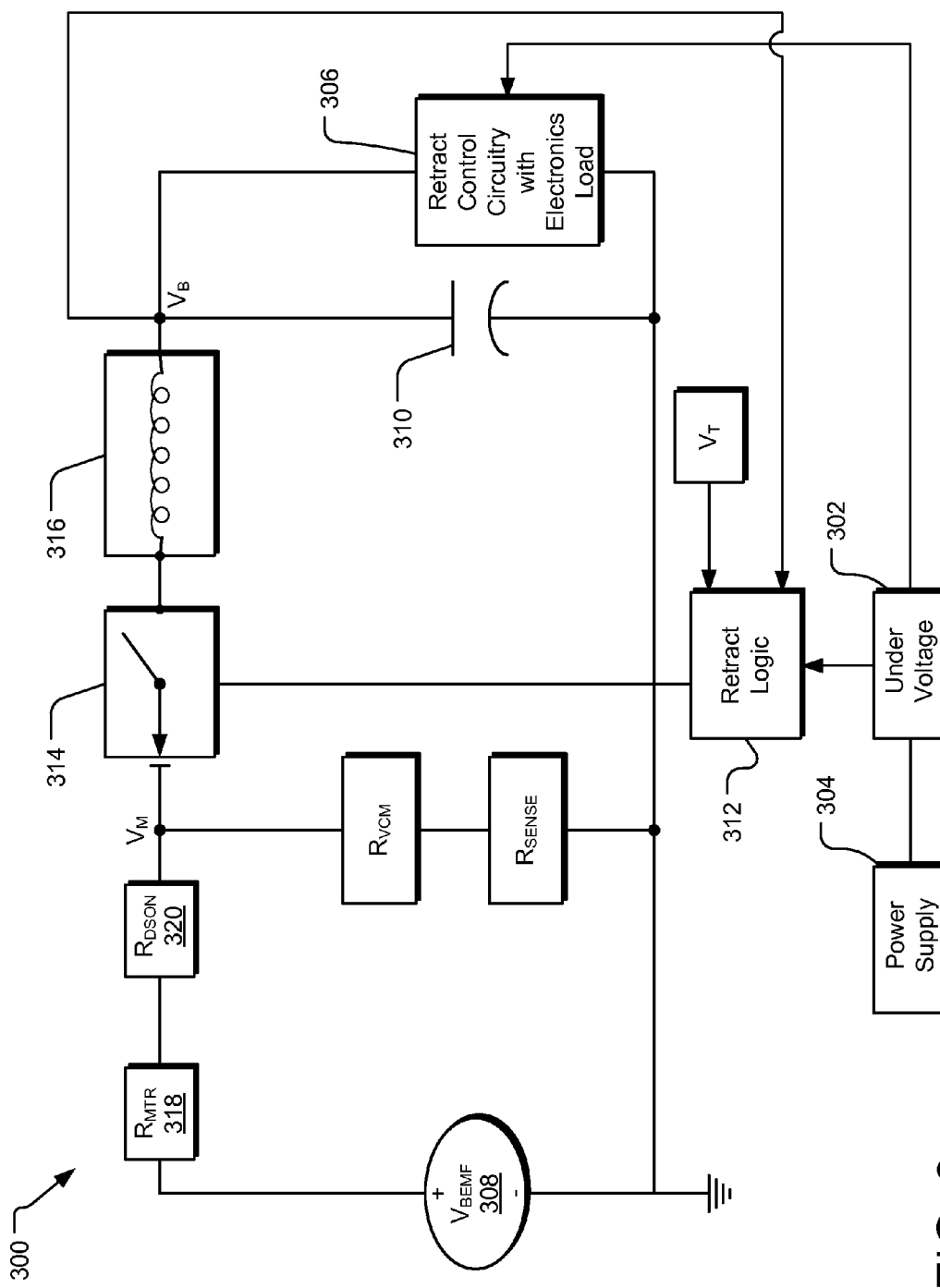
FIG. 3 illustrates example retract circuitry in a data storage device.

FIG. 3 illustrates example retract circuitry 300 in a data storage device. As discussed, an actuator is moved via a first motor (e.g., a VCM) in relation to a storage member (e.g., a data storage disc) that is moved by a second motor (e.g., a spindle motor). The second motor generates $V_{BEMF}$ 308.

The retract circuitry 300 includes an undervoltage detector 302 which detects when supply power is lost to the data storage device by continuously monitoring the state of a power supply 304. For purposes of this disclosure the power supply 304 device is said to provide a supply power in terms of a voltage. When the undervoltage detector 302 detects that the power supply 304 is producing a voltage that has dropped below a predetermined voltage, it sends a signal indicating that a loss of supply power has occurred. This signal is received by a retract control 306, which initiates a retract cycle on the actuator in order to move the head away from any data-containing surface of the disc and to the parked position.

There are two sources of available power remaining after loss of the supply power to the data storage device; the $V_{BEMF}$ 308 generated by the motor as it winds down and a backup capacitor 310 capable of discharging a backup voltage $V_B$. Retract logic 312 is operative on the circuitry of the retract control 306, acting upon receipt of the loss of supply power signal from the undervoltage detector 302 to govern the setting of a switch 314 that, when open as depicted, divides the $V_B$ from the $V_{BEMF}$ 308 to energize the VCM with only the $V_{BEMF}$ 308 and to energize an electronics load of the retract control 306 with only the $V_B$ in the illustrative embodiment. Although in these illustrative embodiments the voltages are divided discretely by the opening of the switch 314, meaning $V_{BEMF}$ downstream of the switch 314 is zero, the contemplated embodiments are not so limited. "Dividing" the voltages $V_B$ and $V_{BEMF}$ for purposes of this disclosure alternatively may include circuitry other than a discrete switch such that the $V_{BEMF}$ downstream of where $V_{BEMF}$ and $V_B$ are divided is a fraction of the $V_{BEMF}$ upstream of where they are divided, such as by use of voltage impedance circuitry including resistors, inductors, capacitors, and the like instead of or in addition to the switch 314. Where the latter is employed the fractional division can vary according to operating parametric considerations such as the power capacity of a backup storage device and the like.

In normal operations, before the loss of supply power indication, the switch 314 by default is closed. With the switch 314 closed (not depicted), the $V_{BEMF}$ 308 is boosted by a voltage regulator 316 and charges the backup capacitor 310.

The retract logic 312 opens the switch 314 when $V_B$ is greater than a predetermined threshold voltage $V_T$. In these illustrative embodiments, $V_T$ can be defined by $V_{BEMF}$ 308 (representing the BEMF voltage output by the motor), which is the ideal $V_{BEMF}$ less voltage drops across the resistance ($R_{MTR}$ 318) of the motor and the resistance ($R_{DSON}$ 320) of the transistor load path, although outer values of $V_T$ may be employed.

Thus, the described embodiments respond to a loss of supply power by dedicating the available $V_{BEMF}$ for addressing the mechanical load requirements of moving the head(s) from the data tracks to the parking zone, and by dedicating the available $V_B$ for addressing the electrical load requirements to power the electronics components (analog and digital) of the retract circuitry 300.

FIG. 4 diagrammatically and graphically depicts considerations for sizing a backup capacitor to provide the $V_B$. The disc 400 is depicted with a head 402, a flexure arm 412, and tab 410 affixed to an actuator arm (not shown) at an initial radial position at time $t_1$ when an undervoltage detector first signals a loss of supply power, calling for retract circuitry to rotate the actuator arm, retracting the head 402 away from the data tracks on the disc 400 and parking the head 402 at a ramp 404.

In these illustrative embodiments of a L/UL drive, as the actuator arm retracts under control of the retract circuitry, the tab (shown as tab 410') engages the ramp's leading inclined surface 406. That displaces the head (obscured by the ramp 404 in FIG. 4) and the flexure arm (shown as flexure arm 412') away from the disc 400. The inclined surface 406 transitions to a leveled surface that defines a parking zone surface 408 of the ramp 404. The tab (shown as tab 410") progresses across the inclined surface of the ramp 404 to the parking zone surface 408 (the head and flexure arm are obscured by the ramp 404). The retract circuitry is coupled to the backup capacitor that is sized to provide that, in view of the expected $V_{BEMF}$ from the motor speed and other factors, $V_B$ remains greater than $V_{BEMF}$ at least during a time interval $T(V_B > V_T)$ (e.g., until $t_2$) within which the $V_{BEMF}$ can move the head 402 from the farthest track location to the parking zone surface 408.

The retract circuitry can positionally control the actuator during the retract cycle by a discontinuous constant velocity (DCV) retract control or a constant voltage retract control. In either event, the retract circuitry defines parameters for a retract cycle on the basis of input variables such as starting track location, environmental conditions, and the like. Parameterization of such things as retract voltage, simultaneous braking, time durations, and duty cycle (for DCV), are performed by the retract circuitry to optimize the retract cycle by ensuring that the head 402 is parked within the time interval $T(V_B > V_T)$.

The bottom portion of FIG. 4 graphically depicts the power relationships during the actuator retraction. Spindle motor circuitry may sense when supply power is lost via voltage zero crossing detection circuitry ($MTR_{XING}$). For purposes of this description it will be understood that the data storage device senses a loss of supply power at time $t_1$. The $V_B$ decay curve in FIG. 4 intersects with the predetermined threshold voltage $V_T$, advantageously affording a margin M above that which is expected to be the power necessary to retract the actuator to the parking zone at time $t_2$. Excess $V_{BEMF}$ can be shed by braking the motor, either subsequent or simultaneous to parking.

Figure 5:
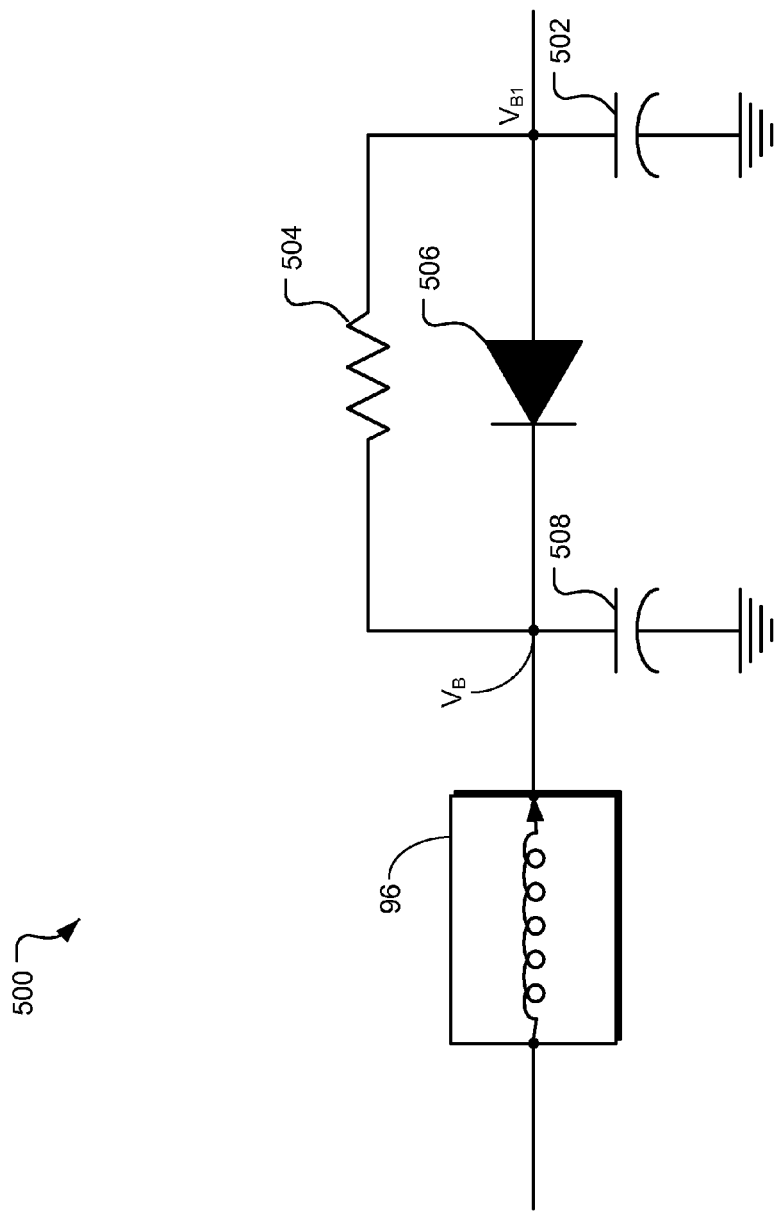
FIG. 5 schematically depicts an alternative embodiment of example retract circuitry in a data storage device.

FIG. 5 schematically depicts a portion of example retract circuitry 500 showing a backup capacitive element including a backup capacitor 502 and a buffer capacitor 508 in a dual capacitor arrangement constructed in accordance with alternative embodiments. Experimental results obtained from reducing these embodiments to practice revealed that by sizing the capacitor at 100 microfarads would reliably provide the necessary time interval $T(V_B > V_T)$ even as the motor wound down to as little as 3600 revolutions per minute. In other cases, it was advantageous to use the capacitive element sized significantly larger than 100 microfarads. This description demonstrates a general case where a comparatively large capacitor is employed to store the necessary energy for the retract cycle during the loss of power event. Using such large capacitor can be problematic for a number of reasons, such as relatively high in-rush current, long start-up time, and reduced booster charge frequency.

These issues may be resolved by the dual capacitor arrangement of FIG. 5, whereby a comparatively small capacitor is connected to $V_B$ to reduce booster ripples. To achieve a shorter start-up time, lower in-rush current and increased charge frequency, a resistor 504 and a diode 506 are connected in parallel between the capacitors 502 and 508. The resistor 504 is a current limiter that determines the charging time of the larger capacitor 502. The diode 506 is forward-biased when the backup capacitor 502 is discharging during a retract cycle. The resistor value may be determined by trading off in-rush current and start-up time of the backup capacitor 502. Experimental results proved that sizing the capacitor backup 502 at 220 microfarads and adding the small buffer capacitor 508, along with a 200 Ohm resistor 504 and a Schottky diode 506 produced substantially similar performance as a 1 microfarad capacitor operating alone in terms of start-up time, in-rush current, and charge frequency.

Figure 6:
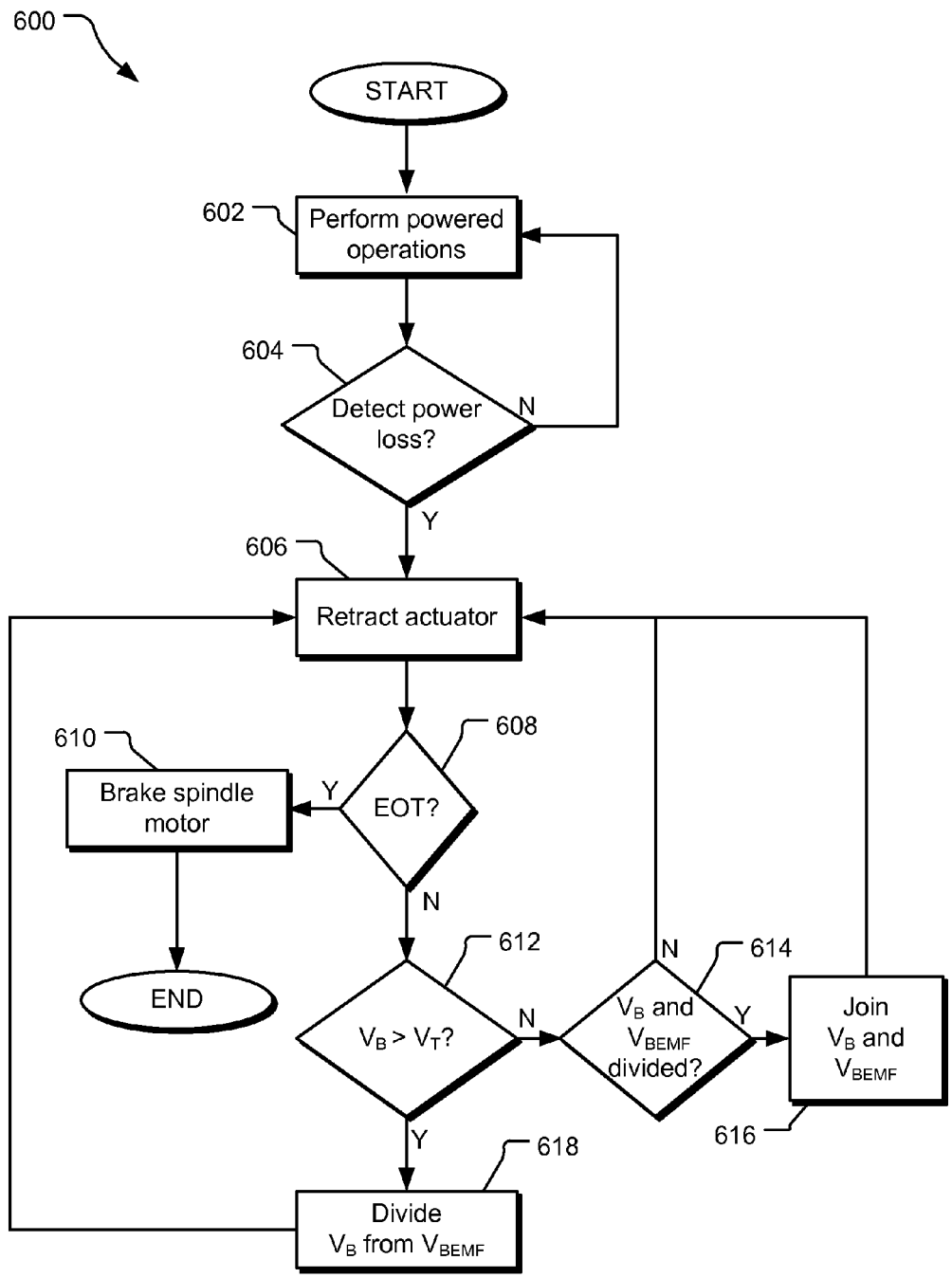
FIG. 6 illustrates example operations for retracting an actuator.

FIG. 6 illustrates example operations 600 for retracting an actuator. A powered operation 602 performs within the normal operational mode of the data storage device, before any indication that any loss of supply power has occurred. In this normal operation mode, a switch (see e.g., the switch 314 in FIG. 3) is closed so that the $V_{BEMF}$ charges a backup capacitive element. A decision operation 604 determines whether a power loss event has occurred, such as described by function of an undervoltage detector. If the determination of the decision operation 604 is "no," then control returns to the powered operation 602, and the data storage device continues to function in the normal (e.g., powered) operation mode.

If, however, the determination of the decision operation 604 is "yes," then a retraction operation 606 initiates a retract cycle to move a head away from data storage tracks on a data storage disc and park the head in an appropriate location, such as on a ramp. Control then passes to travel decision block operation 608, which determines whether the head's end of travel (EOT) has been reached. For example, without limitation, in the illustrative embodiments described herein, the EOT is when the head is secured in the parking zone of the ramp. More particularly, the EOT can be defined in terms of when the tab slidingly traverses an inclined surface of a ramp to slidingly engage a parking zone surface.

If the determination of decision operation 608 is "yes," then the spindle motor can be braked in a braking operation 610 as desired to hasten the wind-down of rotation. Any additional $V_B$ and/or $V_{BEMF}$ can be used to engage the actuator against a positive stop member (not depicted) and/or to actuate a latch (not depicted) to retain it in the parked position.

If, however, the determination of the decision operation 608 is "no," then a retraction decision operation 612 determines whether the $V_B$ is greater than the $V_T$. If the determination of retraction decision operation 612 is "no," then a division determination operation 614 determines whether the $V_B$ and the $V_{BEMF}$ are already divided. If the determination of division determination operation 614 is "no," then control returns to the retraction operation 606 for further retraction control as previously described. If the determination of division determination operation 614 is "yes," then a joining operation 616 re-joins the $V_B$ and the $V_{BEMF}$ and then control returns likewise to the refraction operation 606.

If, however, the determination of the retraction decision operation 612 is "yes," then a voltage division operation 618 divides the $V_B$ from the $V_{BEMF}$ and then control returns to the retraction operation 606 for further retract control as previously described.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, other motor and power cell components and various arrangements thereof than the VCM and capacitor described are contemplated while still maintaining substantially the same functionality without departing from the scope and spirit of the claimed invention. Further, although the illustrative embodiments described herein are directed to data storage devices, and related technology, it will be appreciated by those skilled in the art that the claimed invention can be applied to other devices employing retract circuitry responsive to a loss of supply power as well without departing from the spirit and scope of the present invention.

What is claimed is:

1. An apparatus comprising:
   a retract control circuit for retracting a first member in relation to a second member, the first member selectively moveable by a first motor and the second member selectively moveable by a second motor that operably generates a back electromagnetic force (BEMF) voltage $V_{BEMF}$, the retract control circuit controlling movement of the first member via the first motor in response to a loss of supply power to the second motor;
   a backup power source storing a voltage $V_B$ after the loss of supply power;
   retract logic operative on the retract control circuit to divide the $V_B$ from the $V_{BEMF}$ to energize the first motor by the $V_{BEMF}$ and not the $V_B$ when the $V_B$ is greater than a predetermined threshold voltage and a loss of the supply power to the second motor is detected.

2. The apparatus of claim 1 wherein the retract logic is operative on the retract control circuit such that the dividing the $V_B$ from the $V_{BEMF}$ energizes an electronics load of the retract control circuit by the $V_B$ and not the $V_{BEMF}$ when the $V_B$ is greater than a predetermined threshold voltage.

3. The apparatus of claim 2 wherein, after dividing the $V_B$ from the $V_{BEMF}$, the retract logic is further operative on the retract control circuit to subsequently join the $V_B$ and the $V_{BEMF}$ to energize the first motor and the retract control circuit electronics load when $V_B$ is less than the predetermined threshold voltage.

4. The apparatus of claim 2 wherein the retract control circuit comprises a switch responsive to the retract logic to selectively divide the $V_B$ from the $V_{BEMF}$.

5. The apparatus of claim 3 wherein the backup power source includes a capacitor.

6. The apparatus of claim 5, wherein the capacitor is a first capacitor, further comprising a comparatively smaller second capacitor, and a resistor and a diode connected in parallel between the first and second capacitors.

7. The apparatus of claim 5 wherein the predetermined threshold voltage is substantially equivalent to an output BEMF voltage of the second motor during wind-down after the loss of supply power.

8. The apparatus of claim 7 in a data storage device wherein the first member includes an actuator supporting a data transfer member and the second member includes a storage member, wherein the capacitor is sized so that $V_B$ remains greater than $V_{BEMF}$ during a retract cycle until at least the data transfer member is refracted to a predetermined parking zone surface.

9. The apparatus of claim 8 wherein the parking zone surface is defined by a load/unload ramp.

10. The apparatus of claim 9 wherein the capacitor is sized so that $V_B$ during a retract cycle remains greater than $V_{BEMF}$ until the data transfer member is retracted past an inclined surface of the ramp.

11. The apparatus of claim 8 wherein the parking zone surface is defined by a contact-start-stop surface of the second member.

12. A method comprising:
    monitoring a supply power to a first motor and a second motor in a device having a first member selectively moveable by the first motor and a second member selectively moveable by the second motor, the second motor being operable to generate a back electromagnetic force (BEMF) voltage $V_{BEMF}$;

dividing a backup power source voltage $V_B$ from the $V_{BEMF}$ when the $V_B$ is greater than a predetermined threshold voltage and a loss of the supply power to the second motor is detected; and energizing the first motor with the $V_{BEMF}$ and not the $V_B$, responsive to the dividing operation.

13. The method of claim 12 further comprising energizing an electronics load in circuitry controlling movement of the first member with the $V_B$ and not the $V_{BEMF}$, when the $V_B$ is greater than a predetermined threshold voltage.

14. The method of claim 13 wherein, after the dividing the $V_B$ from the $V_{BEMF}$, subsequently joining the $V_{BEMF}$ and the $V_B$ to energize the first motor and the electronics load when the $V_B$ is less than the predetermined threshold voltage.

15. The method of claim 14 wherein the first member of the device includes an actuator supporting a data transfer member and the second member of the device includes a storage member, wherein energizing the first motor retracts the data transfer member past an inclined surface to a parking zone surface of a ramp adjacent the storage member, and wherein $V_B$ remains greater than the $V_{BEMF}$ at least until the data transfer member retracts past the inclined surface of the ramp.

16. A data storage device configured to operably move an actuator via a first motor in relation to a storage member rotated by a second motor, the second motor generating a back electromagnetic force (BEMF) voltage $V_{BEMF}$, the data storage device comprising retract circuitry that, responsive to a loss of supply power to the data storage device, divides a backup power source voltage $V_B$ from the $V_{BEMF}$ when the $V_B$ is greater than a predetermined threshold voltage, to energize the first motor by the $V_{BEMF}$ and not the $V_B$ and to energize an electronics load of the retract circuitry by the $V_B$ and not the $V_{BEMF}$.

17. The data storage device of claim 16 wherein the retract circuitry comprises a switch that selectively divides the $V_B$ from the $V_{BEMF}$.

18. The data storage device of claim 16 wherein the backup power source includes a capacitor.

19. The data storage device of claim 18 wherein the capacitor includes a first capacitor that is sized so that $V_B$ during a retract cycle remains greater than $V_{BEMF}$ until at least a data transfer member is retracted past an inclined surface of a ramp adjacent the storage member and supported upon a parking zone surface of the ramp, and further comprising a comparatively smaller second capacitor, and a resistor and a diode connected in parallel between the first and second capacitors.

20. The data storage device of claim 16 wherein the predetermined threshold voltage is substantially equivalent to an output BEMF voltage of the second motor during wind-down after the loss of supply power.

* * * * *